United States Patent
Jain

(10) Patent No.: US 11,350,468 B2
(45) Date of Patent: *May 31, 2022

(54) SELECTIVE PROBE-RESPONSE SUPPRESSION

(71) Applicant: ARRIS Enterprises LLC, Suwanee, GA (US)

(72) Inventor: Gagan Jain, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,494

(22) Filed: Sep. 17, 2020

(65) Prior Publication Data

US 2021/0007159 A1 Jan. 7, 2021

Related U.S. Application Data

(63) Continuation of application No. 16/132,585, filed on Sep. 17, 2018, now Pat. No. 10,813,148.

(Continued)

(51) Int. Cl.
*H04W 76/11* (2018.01)
*H04W 48/14* (2009.01)
(Continued)

(52) U.S. Cl.
CPC ............ *H04W 76/11* (2018.02); *H04W 8/005* (2013.01); *H04W 28/06* (2013.01); *H04W 48/14* (2013.01);
(Continued)

(58) Field of Classification Search
None
See application file for complete search history.

(56) References Cited

U.S. PATENT DOCUMENTS 10,813,148 B2 * 10/2020 Jain ...................... H04W 8/005
2007/0243888 A1 10/2007 Faccin et al.
(Continued)

FOREIGN PATENT DOCUMENTS

CN 104104478 A 10/2014
WO 20060133269 A2 12/2006

OTHER PUBLICATIONS

"Chinese Office Action with Translation, corresponding to Application No. 201880066987.3, dated Jul. 20, 2021, 13 pages".
(Continued)

*Primary Examiner* — Jutai Kao
(74) *Attorney, Agent, or Firm* — Steven Stupp; Stewart Wiener

(57) ABSTRACT

An electronic device (such as an access point) that selectively provides a probe response is described. During operation, the electronic device receives a probe request from the second electronic device. Then, the electronic device determines whether one or more response criteria are met or achieved. For example, based at least in part on an identifier of the second electronic device, the electronic device may determine when the one or more response criteria are met by accessing a probe-activity history of the second electronic device that is stored in memory. If the one or more response criteria are met, the electronic device provides the probe response. Otherwise, the electronic device does not provide the probe response and the probe request may be dropped.

20 Claims, 6 Drawing Sheets

Related U.S. Application Data

(60) Provisional application No. 62/559,539, filed on Sep. 16, 2017.

(51) Int. Cl.

| | | |
|---|---|---|
| *H04W 8/00* | (2009.01) | |
| *H04W 28/06* | (2009.01) | |
| *H04W 92/10* | (2009.01) | |
| *H04W 84/12* | (2009.01) | |
| *H04W 48/16* | (2009.01) | |
| *H04W 8/26* | (2009.01) | |
| *H04W 80/02* | (2009.01) | |

(52) U.S. Cl.
CPC ............. *H04W 92/10* (2013.01); *H04W 8/26* (2013.01); *H04W 48/16* (2013.01); *H04W 80/02* (2013.01); *H04W 84/12* (2013.01)

(56) References Cited

U.S. PATENT DOCUMENTS

| | | |
|---|---|---|
| 2013/0109314 A1 | 5/2013 | Kneckt et al. |
| 2013/0111044 A1 | 5/2013 | Sherian et al. |
| 2014/0355589 A1* | 12/2014 | Yang ..................... H04W 48/14 370/338 |
| 2015/0304940 A1* | 10/2015 | Ryu ....................... H04W 8/005 370/338 |
| 2016/0309537 A1 | 10/2016 | Hart et al. |
| 2017/0230811 A1 | 8/2017 | Wentink et al. |
| 2018/0343554 A1* | 11/2018 | Ouzieli ................. H04W 76/10 |
| 2019/0281446 A1* | 9/2019 | Shanbhag ............. H04W 48/14 |

OTHER PUBLICATIONS

PCT International Search Report, PCT/US18/051393, dated Aug. 1, 2019.
PCT Written Opinion of the International Searching Authority, PCT/US18/051393, dated Aug. 1, 2019.

* cited by examiner

SELECTIVE PROBE-RESPONSE SUPPRESSION

CROSS REFERENCE TO RELATED APPLICATIONS

This application is a continuation of U.S. patent Ser. No. 16/132,585, "Selective Probe-Response Suppression," by Gagan Jain, filed on Sep. 17, 2018, which claims priority under 35 U.S.C. 119(e) to U.S. Provisional Application Ser. No. 62/559,539, entitled "Selective Probe-Response Suppression," by Gagan Jain, filed on Sep. 16, 2017, the contents of which are herein incorporated by reference.

BACKGROUND

Field

The described embodiments relate to techniques for an access point to selectively transmit a probe response in response to a probe request from an electronic device.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

In a wireless network based on an IEEE 802.11 standard, an electronic device often actively scans for a nearby operating access point by transmitting a probe request. In response to receiving a probe request, an access point typically transmits a probe response. However, the electronic device may systematically scan the channels in one or more frequency bands. Consequently, the electronic device may transmit multiple probe requests in a 2.4 GHz and/or a 5 GHz frequency band. In addition, the electronic device may also send probe requests in the channels in one or more frequency bands for the saved profiles that are stored on the electronic device, such as, e.g., 20 basic service set identifiers (BSSIDs) of access points, as well as broadcast probe requests. Therefore, the electronic device may regularly send bursts of probe requests to the access point. Moreover, the access point usually transmits numerous probe responses based on these probe requests, which can result in significant overhead in the wireless network and reduced communication performance.

SUMMARY

A described embodiment relates to an electronic device (such as an access point). This electronic device includes an interface circuit that wirelessly communicates with a second electronic device. During operation, the electronic device receives, from the interface circuit, a probe request associated with the second electronic device, where the probe request includes an identifier of the second electronic device (such as a media access control or MAC address). In response, the electronic device determines, based at least in part on the identifier, whether the probe request is a first probe request associated with the second electronic device that the electronic device received. For example, the electronic device may perform a look up in a data structure with a probe-activity history based at least in part on the identifier. If the probe request is the first probe request associated with the second electronic device that the electronic device received, the electronic device provides, from the interface circuit, a probe response intended for the second electronic device.

Otherwise, the electronic device determines whether a predefined time interval has elapsed since the previous probe response intended for the second electronic device. For example, the predefined time interval may correspond to a total scan time of the second electronic device, such as a time interval between, e.g., 0.5-5 s. When the predefined time interval has elapsed since the previous probe response intended for the second electronic device, the electronic device provides, from the interface circuit, the probe response intended for the second electronic device.

Moreover, if the predefined time interval has not elapsed, the electronic device determines whether an acknowledgment associated with the second electronic device was received in response to a previous probe response intended for the second electronic device. If not, the electronic device provides, from the interface circuit, the probe response intended for the second electronic device.

Otherwise, the electronic device does not provide the probe response intended for the electronic device.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

A communication technique is described. During the communication technique, an electronic device (such as an access point) selectively provides a probe response to a second electronic device in response to a probe request from the second electronic device. For example, when the electronic device receives a probe request from the second electronic device, the electronic device determines whether a probe request was previously received from the second electronic device and whether an acknowledgment was previously received from the second electronic device in response to a previous probe response from the electronic device and for the second electronic device. If no, the electronic device determines whether a time interval has elapsed since the previous probe response from the electronic device and for the second electronic device. If yes, the electronic device provides the probe response to the second electronic device. Otherwise, the electronic device suppresses the probe response, i.e., the electronic device does not provide the probe response.

By selectively providing the probe response, the communication technique may reduce overhead and improve throughput and capacity (and, more generally, communication performance) in a wireless network. Consequently, the communication technique may improve the user experience and customer satisfaction of users of the electronic device and/or the second electronic device.

In the discussion that follows, electronic devices or components in a system communicate packets in accordance with a wireless communication protocol, such as: a wireless communication protocol that is compatible with an IEEE 802.11 standard (which is sometimes referred to as 'WiFi®,' from the Wi-Fi Alliance of Austin, Tex.), Bluetooth, and/or another type of wireless interface (such as another wireless-local-area-network interface). Moreover, an access point in the system may communicate with a controller or services using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

Figure 1:
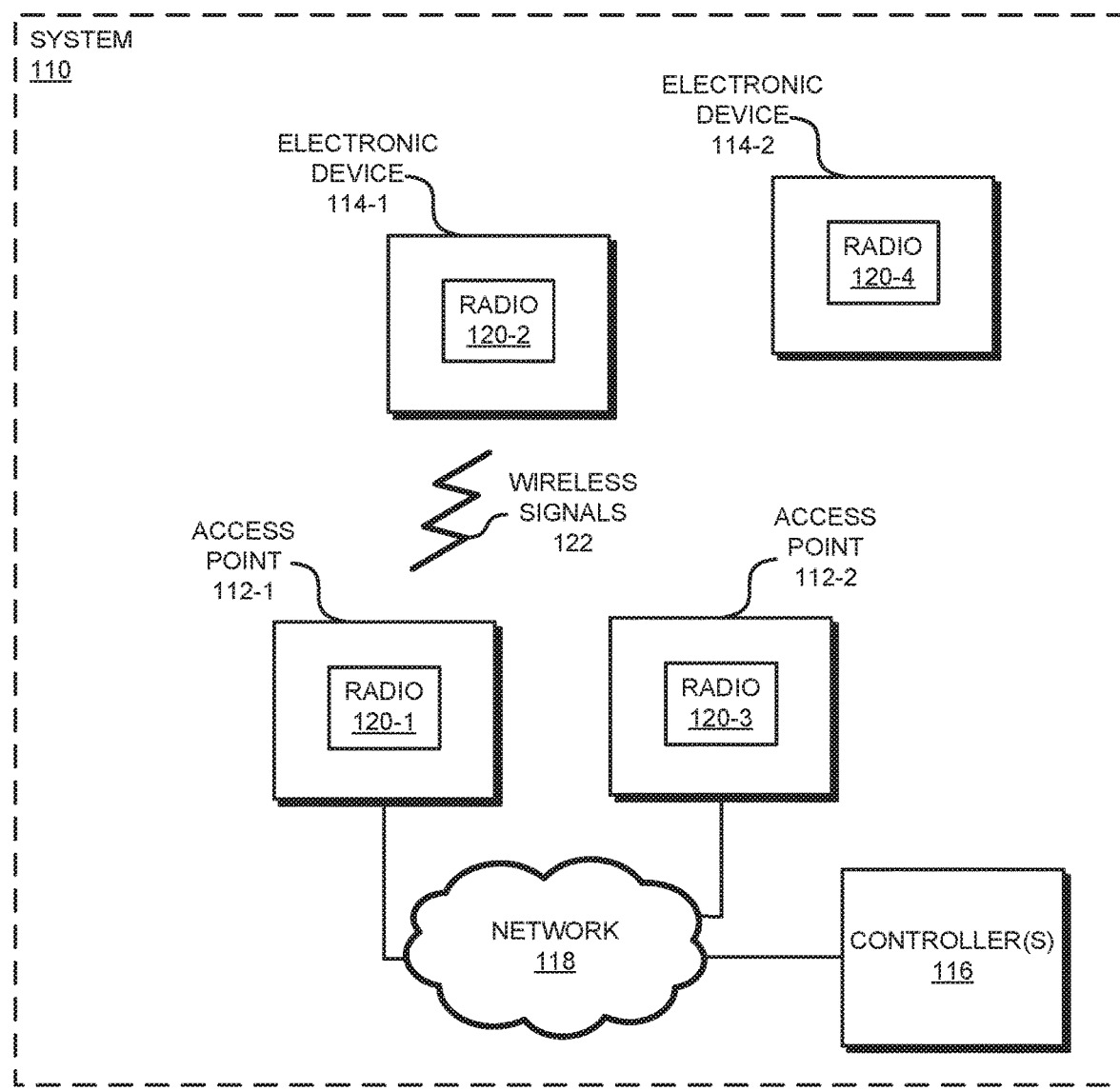
FIG. 1 is a block diagram illustrating an example of a system in accordance with an embodiment of the present disclosure.

We now describe some embodiments of the communication technique. FIG. 1 presents a block diagram illustrating an example of a system 110, which may include components, such as: one or more access points 112, one or more electronic devices 114 (such as cellular telephones, stations, another type of electronic device, etc.), and one or more optional controllers 116. In system 110, one or more of the one or more access points 112 may wirelessly communicate with one or more of the one or more electronic devices 114 using wireless communication that is compatible with an IEEE 802.11 standard. Thus, the wireless communication may occur in, e.g., a 2.4 GHz, a 5 GHz and/or a 60 GHz frequency band. (Note that IEEE 802.11ad communication over a 60 GHz frequency band is sometimes referred to as 'WiGig.' In the present discussion, these embodiments also encompassed by 'Wi-Fi.') However, a wide variety of frequency bands may be used. Moreover, the one or more access points 112 may communicate with the one or more optional controllers 116 via network 118 (such as the Internet, an intra-net and/or one or more dedicated links). Note that the one or more optional controllers 116 may be at the same location as the other components in system 110 or may be located remotely (i.e., at a different location). Moreover, note that the one or more access points 112 may be managed and/or configured by the one or more optional controllers 116. Furthermore, note that the one or more access points 112 may provide access to network 118 (e.g., via an Ethernet protocol), and may be a physical access point or a virtual or 'software' access point that is implemented on a computer or an electronic device. While not shown in FIG. 1, there may be additional components or electronic devices, such as a router.

Additionally, as noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 6:
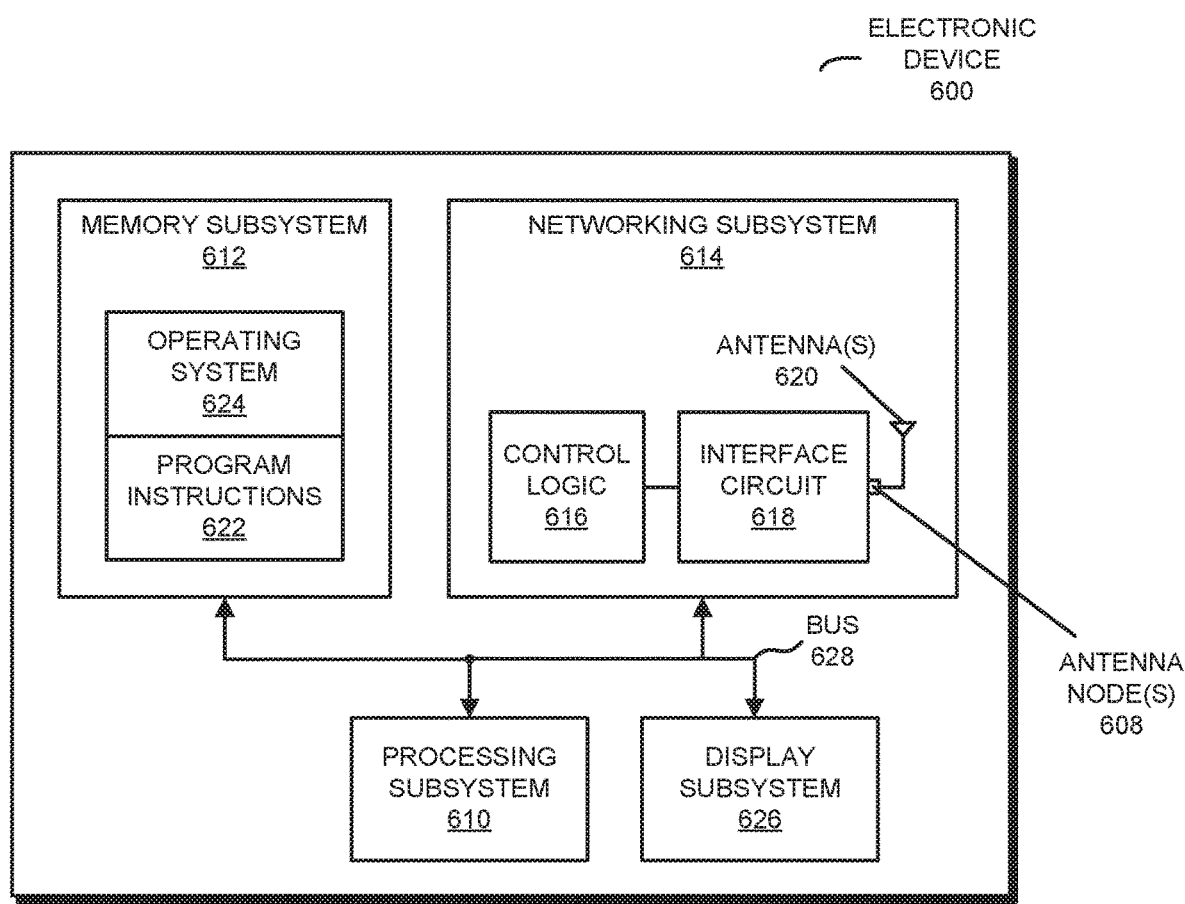
FIG. 6 is a block diagram illustrating an electronic device in accordance with an embodiment of the present disclosure.

As described further below with reference to FIG. 6, the one or more access points 112, the one or more electronic devices 114 and/or the one or more optional controls 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-2 in electronic device 114-1. These wireless signals are received by radio 120-1 in at least one of the one or more access points 112, such as access point 112-1. Notably, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, electronic devices 114 may regularly transmit multiple probe requests. If access points 112 respond by transmitting probe responses to each of the probe requests, significant overhead may occur in the wireless network in system 110, which may adversely impact the communication performance (such as the throughput and/or the capacity).

In order to address these challenges, the one or more access points 112 may implement or use the communication technique. Notably, as discussed further below with reference to FIGS. 2-4, during the communication technique a given one of the one or more access points 112 (such as access point 112-1) may use an identifier (such as a MAC address) of a given one of the one or more electronic devices 114 (such as electronic device 114-1) in a current received probe request to access stored records. For example, as discussed further below with reference to FIG. 5, access point 112-1 may look up in a stored probe-activity history whether a probe request was previously received from electronic device 114-1 (e.g., whether the current probe request is a first probe request received from electronic device 114-1), whether an acknowledgment was received from electronic device 114-1 for a probe response that access point 112-1 transmitted to electronic device 114-1, and/or whether a time interval since a previous probe response (such as a time interval between, e.g., 0.5-5 s) has elapsed. Based at least in part on these conditional requirements, access point 112-1 may selectively suppress transmitting a probe response to electronic device 114-1 in response to the current probe request.

In this way, the communication technique may reduce overhead in the wireless network, and thus may improve the communication performance. For example, using the communication technique, the number of probe responses may be reduced by at least 10-15%.

In the described embodiments, processing a frame or a packet in a given one of the one or more access points 112 or a given one of the one or more electronic devices 114 may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114 and/or the one or more optional controllers 116. As another example, in another embodiment, different electronic devices are transmitting and/or receiving frames or packets.

Figure 2:
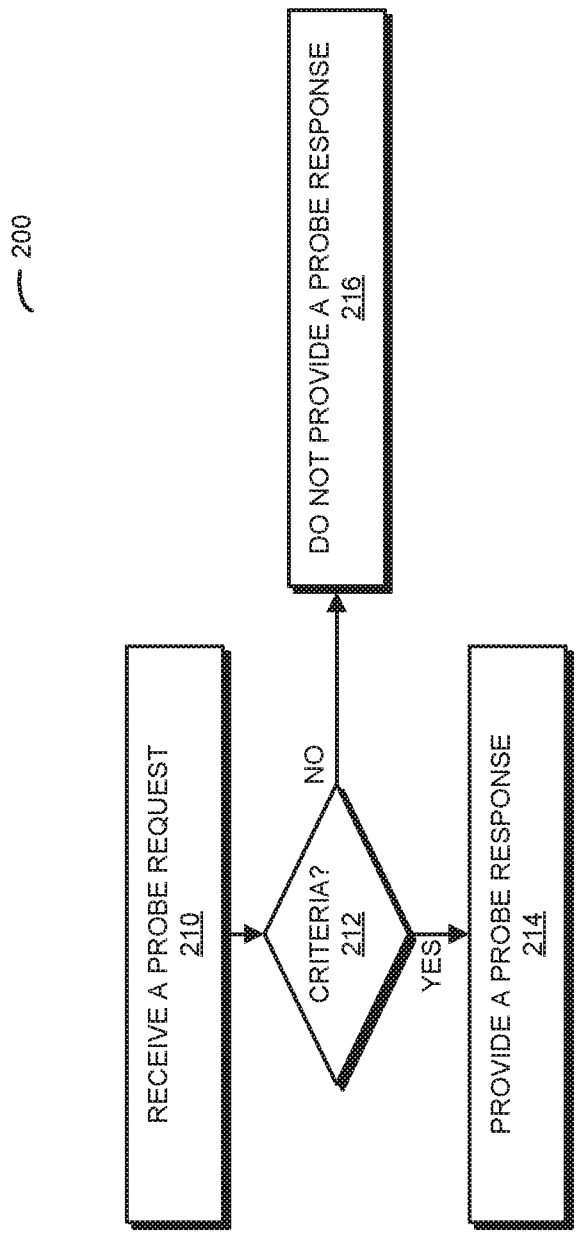
FIG. 2 is a flow diagram illustrating an example method for selectively providing a probe response in the system in FIG. 1 in accordance with an embodiment of the present disclosure.

We now describe embodiments of the method. FIG. 2 presents an example of a flow diagram illustrating an example method 200 for selectively providing a probe response. Moreover, method 200 may be performed by an electronic device, such as one of the one or more access points 112 in FIG. 1, e.g., access point 112-1.

During operation, an electronic device may receive a probe request (operation 210) associated with a second electronic device. For example, the probe request may include an identifier of the second electronic device (such as a MAC address).

In response, the electronic device may determine whether one or more response criteria are met (operation 212). If the one or more response criteria are met (operation 212), the electronic device may provide a probe response (operation 214) intended for the second electronic device in response to the probe request.

Otherwise, if the one or more response criteria are not met (operation 212), the electronic device may not provide a probe response (operation 216) intended for the second electronic device in response to the probe request.

Figure 3:
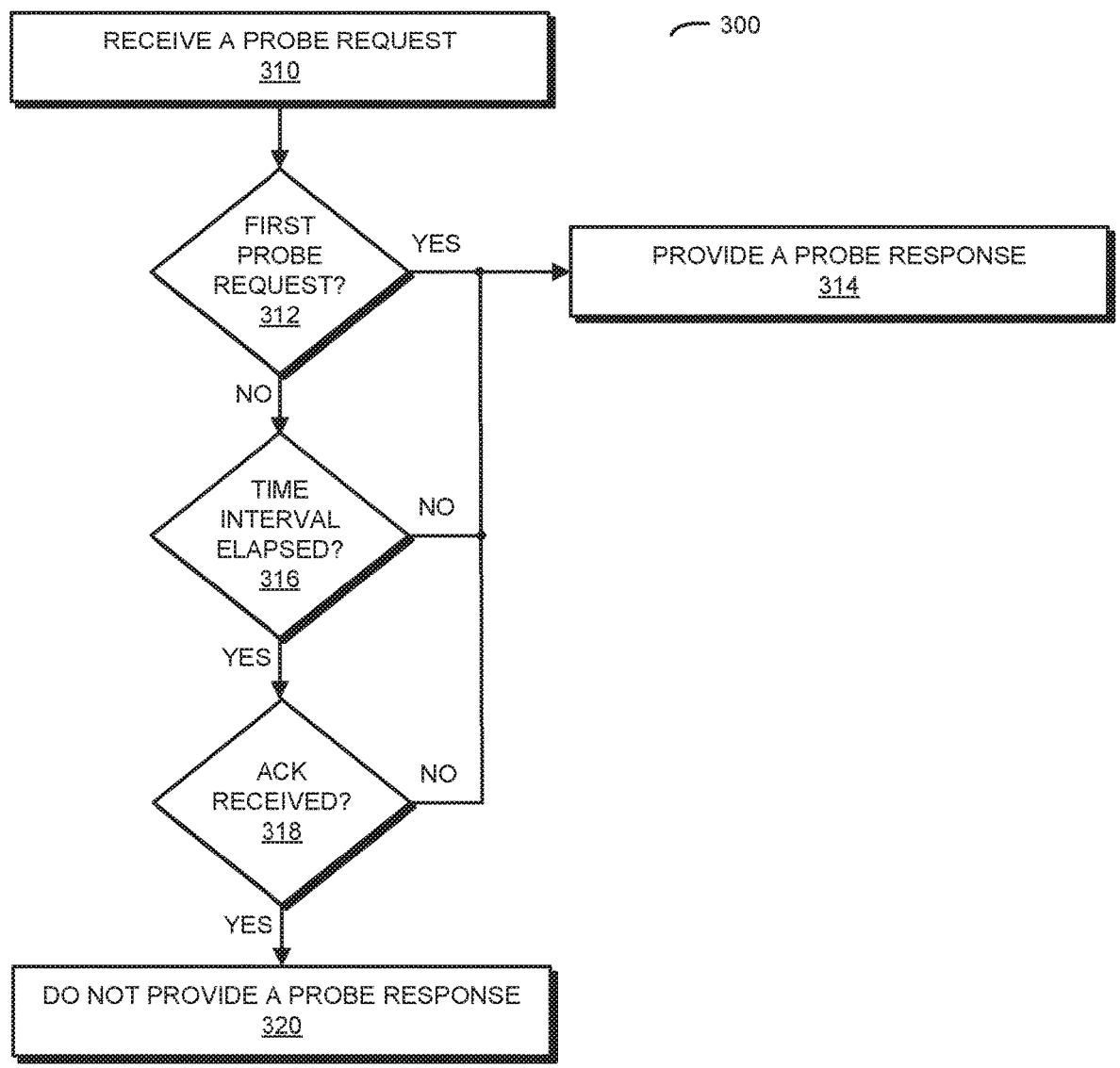
FIG. 3 is a flow diagram illustrating an example method for selectively providing a probe response in the system in FIG. 1 in accordance with an embodiment of the present disclosure.

We now describe a more detailed embodiment of the method. FIG. 3 presents an example of a flow diagram illustrating an example method 300 for selectively providing a probe response. Moreover, method 300 may be performed by an electronic device, such as one of the one or more access points 112 in FIG. 1, e.g., access point 112-1.

During operation, an electronic device may receive a probe request (operation 310) associated with a second electronic device. For example, the probe request may include an identifier of the second electronic device (such as a MAC address).

In response, the electronic device may determine based at least in part on the identifier whether the probe request is a first probe request (operation 312) associated with the second electronic device that the electronic device received. For example, the electronic device may perform a look up in a data structure with a probe-request history based at least in part on the identifier.

If the probe request is the first probe request (operation 312) associated with the second electronic device that the electronic device received, the electronic device may provide a probe response (operation 314) intended for the second electronic device. For example, the probe response may include information that specifies an address or the identifier of the second electronic device. Note that the electronic device may track whether an acknowledgment (ACK) associated with the second electronic device is received in response to the probe response and may accordingly update the probe-activity history, including whether an acknowledgment is received and a time of the most-recent probe request and/or the most-recent probe response.

Otherwise (operation 312), the electronic device may determine whether a predefined time interval has elapsed (operation 316) since the previous probe response intended for the second electronic device. For example, the predefined time interval may correspond to a total scan time of the second electronic device, such as a time interval between, e.g., 0.5-5 s. When the predefined time interval has elapsed (operation 316) since the previous probe response intended for the second electronic device, the electronic device may provide the probe response (operation 314) intended for the second electronic device.

Moreover, if the predefined time interval has not elapsed (operation 316), the electronic device may determine whether an acknowledgment associated with the second electronic device (such as an acknowledgment that included the identifier) was received (operation 318) in response to a previous probe response intended for the second electronic device. If not (operation 318), the electronic device may provide the probe response (operation 314) intended for the second electronic device.

Otherwise (operation 318), the electronic device may not provide the probe response (operation 320) intended for the second electronic device. Instead, the electronic device may drop the probe request.

In some embodiments of methods 200 (FIG. 2) and/or 300, there may be additional or fewer operations. Moreover, there may be different operations. Furthermore, the order of the operations may be changed, and/or two or more operations may be combined into a single operation.

Figure 4:
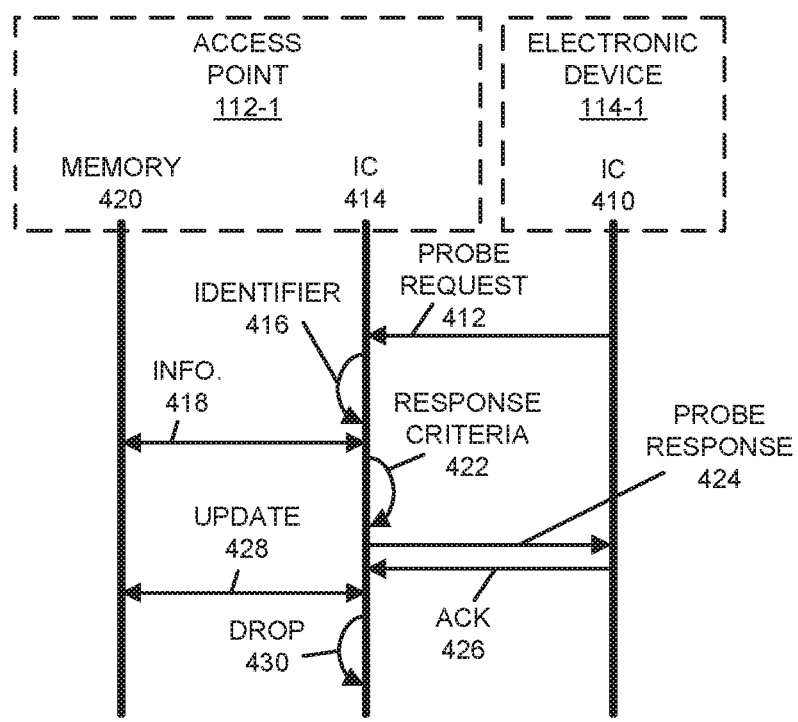
FIG. 4 is a drawing illustrating an example of communication among electronic devices in FIG. 1 in accordance with an embodiment of the present disclosure.

FIG. 4 presents a drawing illustrating an example of communication between access point 112-1 and electronic device 114-1. In FIG. 4, an interface circuit (IC) 410 in electronic device 114-1 may transmit or provide a probe request 412 to access point 112-1.

After receiving probe request 412, interface circuit 414 in access point 112-1 may extract an identifier 416 of electronic device 114-1 from probe request 412, and may access stored information 418 (such as a look-up table with a probe-activity history associated with electronic device 114-1) in memory 420 in access point 112-1.

Based at least in part on the stored information 418, interface circuit 414 may determine whether one or more response criteria 422 are met. If the one or more response criteria 422 are met, interface circuit 414 may provide a probe response 424 to electronic device 112-1 in response to probe request 412. After receiving probe response 424, interface circuit 410 may provide an acknowledgment 426 to access point 112-1. Moreover, after receiving acknowledgment 426, interface circuit 410 may update 428 the stored information in memory 420 (such as the probe-activity history). For example, interface circuit 410 may update a time when probe response 424 was transmitted and whether it was successfully received by electronic device 112-1.

Otherwise, interface circuit 414 may not provide probe response 424, i.e., probe request 412 may be discarded or dropped 430.

While FIG. 4 illustrates some operations using unilateral or bilateral communication, in general a given operation in FIG. 4 may involve unilateral or bilateral communication.

Figure 5:
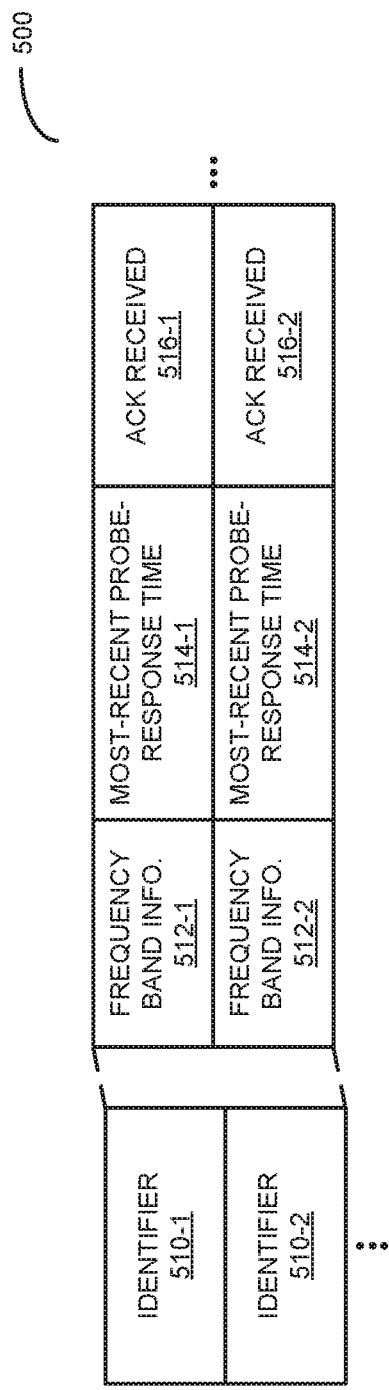
FIG. 5 is a drawing of an example data structure that is used by an access point in the system in FIG. 1 in accordance with an embodiment of the present disclosure.

FIG. 5 presents a drawing of a data structure 500 (such as a probe-activity history) that is used by an access point, such as one of the one or more access points 112 in FIG. 1, e.g., access point 112-1. Data structure 500 may include: identifiers 510 (such as MAC addresses), frequency-band information 512 (such as, e.g., 2.4 or 5 GHz), last or most-recent probe-response times 514, and/or whether an acknowledgment was received 516. However, data structure 500 may include more or fewer fields or entries.

In some embodiments, the communication technique facilitates probe-response suppression using a minimum probe-response gap or time interval. Wi-Fi devices often use channel-scanning techniques to scan the nearby operating access points. Notably, unless restricted by regulators, a Wi-Fi client device (such as one of electronic devices 114 in FIG. 1) may use probe requests based at least in part on an active-scanning technique to quickly scan the nearby access points. A dual-band Wi-Fi client device may go through each channel one by one, and may perform the scan by sending a burst of probe requests and listening for probe responses. The Wi-Fi client device may perform this on each and every channel one by one on both the 2.4 and 5 GHz frequency bands. Note that the Wi-Fi client device may send one directed probe request for each saved profile and one broadcast probe request with a null service set identifier (SSID) every time they want to scan on each of the channels. Thus, the Wi-Fi client device may frequently send bursts of probe requests, such as bursts with less than a few seconds gap.

Whenever an access point receives a directed probe request with an SSID that matches its own SSID or a broadcast probe request, the access point may send one unicast probe response to the Wi-Fi client device. If the client sends numerous probe requests, the access point may, therefore, send numerous probe responses.

For example, in a stadium, where access points may be are deployed 25-30 meters apart, there are many Wi-Fi client devices, and if each Wi-Fi client device scans by sending probe requests, the wireless environment may be very noisy. Indeed, 70-80% of airtime utilization may be associated with management frames, which impacts the overall performance of the access points. This may adversely impact the communication performance (such as the throughput) and thus the user experience.

The communication technique reduces the number of probe responses transmitted by an access point while maintaining the same level of client service and connectivity. This approach may not adversely impact service, because Wi-Fi client devices may frequently send bursts of probe requests even when they are not connected. Consequently, it may not matter if an access point sends one probe response or ten probe responses, because the scanning objective of the Wi-Fi client devices may be fulfilled when they successfully receive one probe response.

In the communication technique, an access point may maintain a running or look-up table that lists all the Wi-Fi client devices from which the access point has received probe requests. Moreover, while processing a probe request, if the access point sends a probe response, the access point may store the time for the last or most-recent probe response it sent to a particular Wi-Fi client device. Furthermore, the access point may store whether the probe response was successfully transmitted over the air or not by tracking whether an acknowledgment was subsequently received.

Then, when the access point receives a subsequent probe request from the same Wi-Fi client device, the access point may look up the stored information and to determine whether a probe response was transmitted to this Wi-Fi client device within a minimum probe response gap or time interval and whether the last probe response was successfully transmitted over the air or not. If the access point receives a new probe request from same Wi-Fi client device in less than the minimum probe response gap and the previous probe response was successfully transmitted, the access point may discard the current probe request and may not send the probe response.

Note that the look up may be based at least in part on an identifier in a probe request, such as a MAC address. The MAC address may work even for a Wi-Fi client device that is unassociated. However, in other embodiments, different identifiers may be used, such as the association identity or identifier (AID).

In some embodiments, the minimum probe response gap or time interval corresponds to a scan time of a Wi-Fi client device. For example, a 2.4 GHz frequency band may include 13 20 MHz channels, and a 5 GHz frequency band may include 25 20 MHz channels. Thus, there may be, e.g., a total of 38 channels. Moreover, a Wi-Fi client device may have, e.g., a 40 ms channel dwell time. Thus, the total scan duration for a dual-band Wi-Fi client device may include, e.g., 1.52 s of airtime and approximately 2-3 s to find or identify an available channel. Consequently, the time interval may be, e.g., between 0.5-10 s.

We now describe embodiments of an electronic device, which may perform at least some of the operations in the communication technique. For example, the electronic device may include a component in system 110, such as one of: the one or more access points 112, the one or more electronic devices 114 and/or the one or more optional controllers 116. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, graphical processor units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory (which collectively or individually are sometimes referred to as a 'computer-readable storage medium'). In some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 600 may be adapted or changed using pattern shapers (such as reflectors) in one or more antennas 620 (or antenna elements), which can be independently and selectively electrically coupled to ground to steer the transmit antenna radiation pattern in different directions. Thus, if one or more antennas 620 includes N antenna-radiation-pattern shapers, the one or more antennas 620 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting frames and/or scanning for frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 622, operating system 624 (such as a driver for interface circuit 618) or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
an antenna node; and
a communication circuit, coupled to the antenna node, configured to communicate with a second electronic device, wherein the communication circuit is configured to:
receive a probe request associated with the second electronic device, wherein the probe request comprises an identifier of the second electronic device;
determine, based at least in part on the identifier, whether one or more response criteria are met, wherein the one or more response criteria comprise whether a predefined time interval has elapsed since a previous probe response intended for the second electronic device was provided by the electronic device, and wherein the predefined time interval corresponds to a total scan time of the second electronic device;

when the one or more response criteria are met, provide, via the communication circuit, a probe response intended for the second electronic device; and otherwise, not provide the probe response intended for the second electronic device.

2. The integrated circuit of claim 1, wherein the identifier comprises a media access control (MAC) address or an association identifier (AID).

3. The integrated circuit of claim 1, wherein the one or more response criteria comprise whether the probe request is a first probe request associated with the second electronic device that the electronic device received; and wherein the probe response is provided when the probe request is the first probe request.

4. The integrated circuit of claim 1, wherein, when the predefined time interval has not elapsed since the previous probe response intended for the second electronic device, the one or more response criteria comprise whether an acknowledgment associated with the second electronic device was not received in response to the previous probe response intended for the second electronic device; and wherein the probe response is provided when the acknowledgment was not received in response to the previous probe response intended for the second electronic device.

5. The integrated circuit of claim 1, wherein the determining comprises accessing, in memory, a probe-activity history associated with the second electronic device.

6. The integrated circuit of claim 5, wherein the probe-activity history comprises a history of probe requests associated with the second electronic device and probe responses intended for the second electronic device, and whether an acknowledgment was received in response to at least a most-recent probe response.

7. The integrated circuit of claim 1, wherein the one or more response criteria are based at least in part on stored information that is maintained by the integrated circuit.

8. A non-transitory computer-readable storage medium for use in conjunction with an integrated circuit, the computer-readable storage medium storing program instructions, wherein, when executed by the integrated circuit, the program instructions cause the integrated circuit to perform one or more operations comprising:

receiving a probe request associated with a second electronic device, wherein the probe request comprises an identifier of the second electronic device;

determining, based at least in part on the identifier, whether one or more response criteria are met, wherein the one or more response criteria comprise whether a predefined time interval has elapsed since a previous probe response intended for the second electronic device was provided by the electronic device, and wherein the predefined time interval corresponds to a total scan time of the second electronic device;

when the one or more response criteria are met, providing a probe response intended for the second electronic device; and otherwise, not providing the probe response intended for the second electronic device.

9. The non-transitory computer-readable storage medium of claim 8, wherein the identifier comprises a media access control (MAC) address or an association identifier (AID).

10. The non-transitory computer-readable storage medium of claim 8, wherein the one or more response criteria comprise whether the probe request is a first probe request associated with the second electronic device that the electronic device received; and wherein the probe response is provided when the probe request is the first probe request.

11. The non-transitory computer-readable storage medium of claim 8, wherein, when the predefined time interval has not elapsed since the previous probe response intended for the second electronic device, the one or more response criteria comprise whether an acknowledgment associated with the second electronic device was not received in response to the previous probe response intended for the second electronic device; and wherein the probe response is provided when the acknowledgment was not received in response to the previous probe response intended for the second electronic device.

12. The non-transitory computer-readable storage medium of claim 8, wherein the determining comprises accessing, in memory, a probe-activity history associated with the second electronic device.

13. The non-transitory computer-readable storage medium of claim 12, wherein the probe-activity history comprises a history of probe requests associated with the second electronic device and probe responses intended for the second electronic device, and whether an acknowledgment was received in response to at least a most-recent probe response.

14. The non-transitory computer-readable storage medium of claim 8, wherein the one or more response criteria are based at least in part on stored information that is maintained by the integrated circuit.

15. A method for selectively providing a probe response, comprising:

by an integrated circuit:

receiving a probe request associated with a second electronic device, wherein the probe request comprises an identifier of the second electronic device;

determining, based at least in part on the identifier, whether one or more response criteria are met, wherein the one or more response criteria comprise whether a predefined time interval has elapsed since a previous probe response intended for the second electronic device was provided by the electronic device, and wherein the predefined time interval corresponds to a total scan time of the second electronic device;

when the one or more response criteria are met, providing a probe response intended for the second electronic device; and otherwise, not providing the probe response intended for the second electronic device.

16. The method of claim 15, wherein the identifier comprises a media access control (MAC) address or an association identifier (AID).

17. The method of claim 15, wherein the one or more response criteria comprise whether the probe request is a first probe request associated with the second electronic device that the electronic device received; and wherein the probe response is provided when the probe request is the first probe request.

18. The method of claim 15, wherein, when the predefined time interval has not elapsed since the previous probe response intended for the second electronic device, the one or more response criteria comprise whether an acknowledgment associated with the second electronic device was not received in response to the previous probe response intended for the second electronic device; and wherein the probe response is provided when the acknowledgment was not received in response to the previous probe response intended for the second electronic device.

19. The method of claim 15, wherein the determining comprises accessing, in memory, a probe-activity history associated with the second electronic device.

20. The method of claim 19, wherein the probe-activity history comprises a history of probe requests associated with the second electronic device and probe responses intended for the second electronic device, and whether an acknowledgment was received in response to at least a most-recent probe response.

* * * * *